United States Patent
Lafiandra et al.

(10) Patent No.: US 10,054,040 B2
(45) Date of Patent: Aug. 21, 2018

(54) SYSTEM FOR PROTECTING A TURBO-SUPERCHARGING SYSTEM, IN PARTICULAR FOR PREVENTING A RESPECTIVE DAMAGE WHEN A PRESSURE OF A RESPECTIVE LUBRICATING OIL IS INSUFFICIENT

(71) Applicant: FPT Industrial S.P.A., Turin (IT)

(72) Inventors: Michele Lafiandra, Avigliana (IT); Enrico Sticchi, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 386 days.

(21) Appl. No.: 14/489,824

(22) Filed: Sep. 18, 2014

(65) Prior Publication Data

US 2015/0089939 A1    Apr. 2, 2015

(30) Foreign Application Priority Data

Sep. 30, 2013    (IT) .............. MI2013A1609

(51) Int. Cl.
| F02B 37/18 | (2006.01) |
| F01D 17/10 | (2006.01) |
| F01D 25/18 | (2006.01) |
| F02B 39/14 | (2006.01) |

(52) U.S. Cl.
CPC .......... F02B 37/183 (2013.01); F01D 17/105 (2013.01); F01D 25/18 (2013.01); F02B 37/186 (2013.01); F02B 39/14 (2013.01); F05D 2220/40 (2013.01); Y02T 10/144 (2013.01)

(58) Field of Classification Search
CPC ...... F02B 37/183; F02B 39/14; F02B 37/186; F02B 37/18; F02B 37/12; F02B 2039/162; F02B 2039/164; F02B 2039/166; F02B 2039/168; F01D 17/105; F01D 25/18; F01D 25/183; F01D 25/12; F01D 25/186; F05D 2220/40; Y02T 10/144
USPC .................................. 60/602, 605.3
See application file for complete search history.

(56) References Cited

U.S. PATENT DOCUMENTS

| 1,346,563 | A | * | 7/1920 | Sherbondy | ............... F02B 37/18 137/81.1 |
| 3,045,420 | A | * | 7/1962 | Addie | ....................... F01M 1/02 123/41.15 |
| 3,089,304 | A | * | 5/1963 | Bozzola | ................ F01D 17/105 123/198 D |
| 3,102,382 | A | * | 9/1963 | Bozzola | ................ F01D 17/105 123/198 R |

(Continued)

FOREIGN PATENT DOCUMENTS

| FR | 2925591 A1 * | 6/2009 | .......... F01D 21/006 |
| GB | 917600 A * | 2/1963 | |

*Primary Examiner* — Phutthiwat Wongwian
*Assistant Examiner* — Jessica Kebea
(74) *Attorney, Agent, or Firm* — Stetina Brunda Garred and Brucker

(57) ABSTRACT

System for protecting a turbo-supercharging unit (T, C), in particular for preventing a respective damage when a pressure of a respective lubrication oil is insufficient, comprising first bypass means (OV, GB) of exhaust gas, controlled as a function of a pressure of the lubricating oil of the turbo-supercharging unit (T, C), in order to allow to at least a part of the exhaust gas to bypass the turbine (T) when the pressure is below a first predetermined threshold.

6 Claims, 7 Drawing Sheets

(56) References Cited

U.S. PATENT DOCUMENTS

| | | | | | |
|---|---|---|---|---|---|
| 3,104,520 | A | * | 9/1963 | Cazier | F02B 37/183 |
| | | | | | 415/13 |
| 3,611,711 | A | * | 10/1971 | Mueller | F02B 37/164 |
| | | | | | 137/14 |
| 4,005,578 | A | * | 2/1977 | McInerney | F02B 37/186 |
| | | | | | 123/564 |
| 4,005,579 | A | * | 2/1977 | Lloyd | F02B 37/186 |
| | | | | | 123/564 |
| 4,174,617 | A | * | 11/1979 | Jalali-Karchay | F02B 37/186 |
| | | | | | 318/295 |
| 4,244,187 | A | * | 1/1981 | Lane | F01N 3/18 |
| | | | | | 60/280 |
| 4,387,572 | A | * | 6/1983 | Richardson | F02B 37/164 |
| | | | | | 60/602 |
| 4,466,247 | A | * | 8/1984 | Aoki | F02B 37/186 |
| | | | | | 60/602 |
| 2011/0265472 | A1 | * | 11/2011 | Wade | F02B 37/183 |
| | | | | | 60/602 |

* cited by examiner

SYSTEM FOR PROTECTING A TURBO-SUPERCHARGING SYSTEM, IN PARTICULAR FOR PREVENTING A RESPECTIVE DAMAGE WHEN A PRESSURE OF A RESPECTIVE LUBRICATING OIL IS INSUFFICIENT

CROSS REFERENCE TO RELATED APPLICATIONS

The present application claims priority to Italian Patent Application No. MI2013A001609 filed Sep. 30, 2013, the entirety of the disclosures of which are expressly incorporated herein by reference.

STATEMENT RE: FEDERALLY SPONSORED RESEARCH/DEVELOPMENT

Not Applicable.

APPLICATION FIELD OF THE INVENTION

The present invention refers to the field of the system for protecting a supercharging unit of internal combustion engines. In particular the present invention refers to the field of the systems for preventing a damage of the turbo-supercharger when the pressure of the lubricating oil is not sufficient.

DESCRIPTION OF THE PRIOR ART

The viscosity of the lubricating oil is highly influenced by the environmental conditions. Thus, when the engine is cold, at low temperature, the viscosity of the oil increases and consequently it takes more time for the oil to reach the housing of the turbine and/or the supercharger and thus the bearings thereof.

In this interval of time, the turbo-supercharger runs without oil, with a serious deterioration of the bearings.

SUMMARY OF THE INVENTION

Therefore the aim of the present invention is to overcome all the aforementioned drawbacks and to provide a simple and effective system for protecting the turbine, which allows to prevent the damage of the turbo-supercharger when a pressure of a respective lubricating oil is insufficient.

The basic idea of the present invention is to introduce a bypass valve of the exhaust gases controlled by the pressure of the lubricating oil in the turbo-supercharger, in order to allow at least part of the exhaust gases of the internal combustion engine, to bypass the turbine and to flow out, until the oil reaches a predefined pressure.

Thus, said bypass valve is a "minimum pressure valve".

According to a preferred alternative embodiment of the invention, such bypass valve is integrated in a special wastegate valve.

Wastegate valves are "maximum pressure valves", generally used to bypass the turbine when the pressure in the intake circuit exceeds a determined threshold.

According to a preferred implementation of the system that is object of the present invention, a wastegate valve integrates, in a single body, the aforementioned "minimum pressure valve" in order to bypass the turbine when the pressure of the lubricating oil of the turbo-supercharger does not reach a predefined threshold, which can preferably be set.

An object of the present invention is a system for protecting a turbo-supercharging system, in particular for preventing a respective damage when a pressure of a lubricating oil is insufficient, in accordance with claim 1.

It is also object of the present invention a method for protecting a turbo-supercharging system, in particular for preventing a respective damage when a pressure of a lubricating oil is insufficient.

Another object of the present invention is a vehicle comprising an internal combustion engine equipped with a turbo-supercharging system and with the aforementioned protection system.

Advantageously, the management of the supercharging pressure is made as a function of the pressure of the lubricating oil.

Furthermore, the solution here described can be applied to a traditional system; such invention, by using a device adapted to modulate the pressure of the lubricating oil, allows to exploit the bypass control of the turbine, which continues to be actuated also pneumatically, with the advantage of having a reservoir of energy available in advance with respect to the pneumatic control for the thermal management of the engine at warm up.

The claims are an integral part of the present description.

BRIEF DESCRIPTION OF THE FIGURES

Further purposes and advantages of the present invention will become clear from the following detailed description of a preferred embodiment (and of its alternative embodiments) and the drawings that are attached hereto, which are merely illustrative and non-limitative, in which:

In the figures the same reference numbers and letters identify the same elements or components.

For more convenience, only FIG. 4 is provided with all the reference signs that are intended as repeated in the other figures.

DETAILED DESCRIPTION OF PREFERRED EMBODIMENTS OF THE INVENTION

Figure 1:
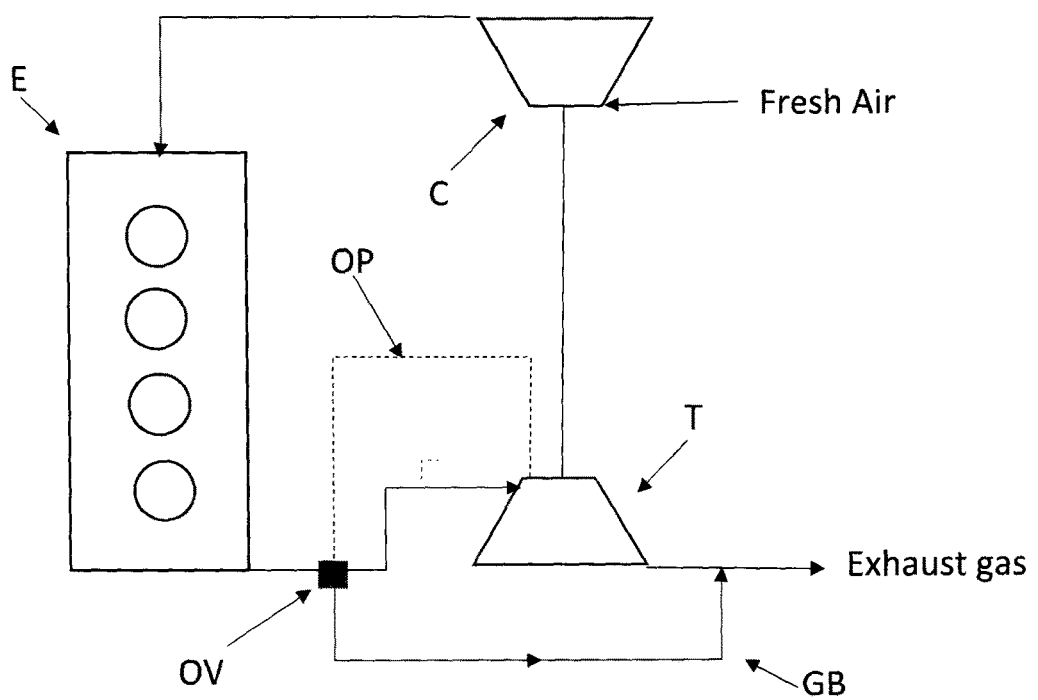
FIG. 1 shows schematically a supercharged internal combustion engine equipped with the system for protecting a turbo-supercharging system, in particular for preventing a respective damage when a pressure of a lubricating oil is insufficient.

FIG. 1 shows a scheme of an internal combustion engine E equipped with at least one turbo-supercharging stage comprising a turbine T having an inlet connected with the exhaust manifold of the internal combustion engine and a compressor C, driven by the turbine T, having an outlet connected with the intake manifold IM of the internal combustion engine E.

Between the exhaust manifold of the internal combustion engine E and the inlet of the turbine T, a pressure valve OV is arranged being driven by the lubricating oil of the turbine T or, more in particular, by the lubricating oil of the turbo-supercharging unit. For more convenience, such valve OV will be hereinafter indicated as "oil-driven valve" or "minimum pressure valve".

In the drawings, the caption "air from compressor" indicates the pneumatic connection with a duct arranged between the intake manifold of the internal combustion engine and the outlet of the supercharger C.

In the drawings, the caption "oil from the bearing housing" indicates the hydraulic connection with the lubricating circuit of the turbo-supercharging unit that lubricates the bearings of the unit itself.

Such valve OV comprises
- a driving inlet connected to the lubricating circuit of the turbo-supercharging unit,
- bypass means (SH,GB) to control/deviate the flow of the exhaust gases coming from the exhaust manifold of the internal combustion engine E, so as to bypass the turbine T of the turbo-supercharging unit.

The oil-driven pressure valve OV works in a way contrary to a wastegate valve, as it forces the exhaust gases to bypass the turbine when the pressure of the lubricating oil is lower than a predefined threshold, that can preferably be set.

Wastegate valves, by contrast, control the bypass of the turbine when the pressure level in the intake circuit exceeds another predefined threshold.

The alternative embodiment shown in FIG. 1 can be combined with the use of a wastegate valve per se known.

In particular, the scheme may provide that the wastegate valve allows to bypass the turbine T by means of a further or of the same bypass pipe GB.

According to a preferred embodiment of the invention, the oil-driven valve OV is integrated in a wastegate valve and vice versa. This allows to use one single bypass pipe, without modifying the layout of the scheme.

Figures 2A, 2B:
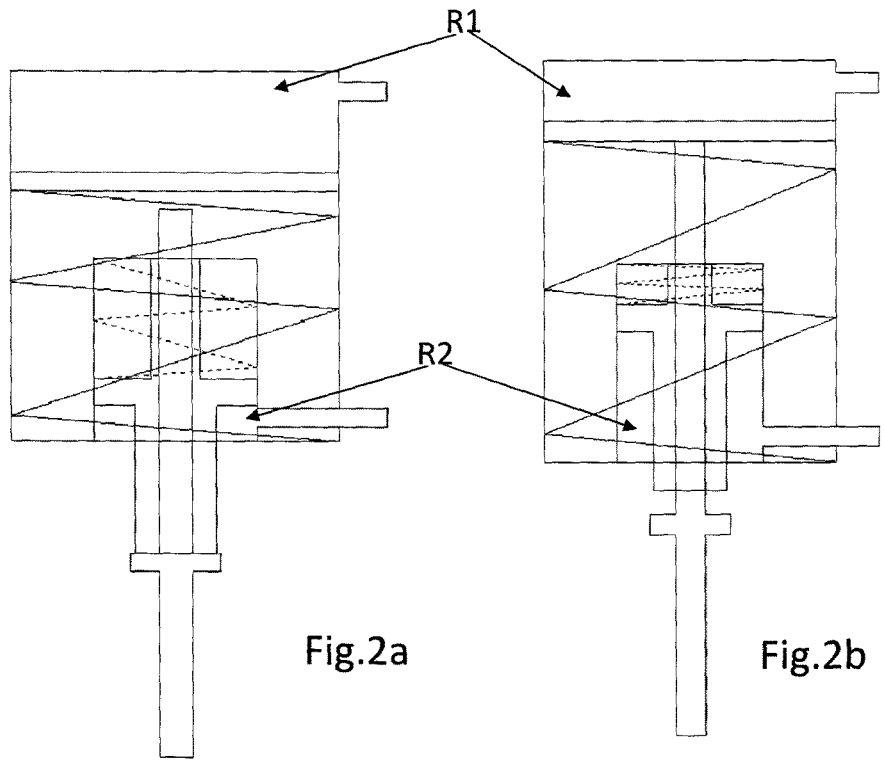
FIGS. 2a-2d show a preferred implementation of a part of the system of FIG. 1, in a schematic way.
Figures 2C, 2D:
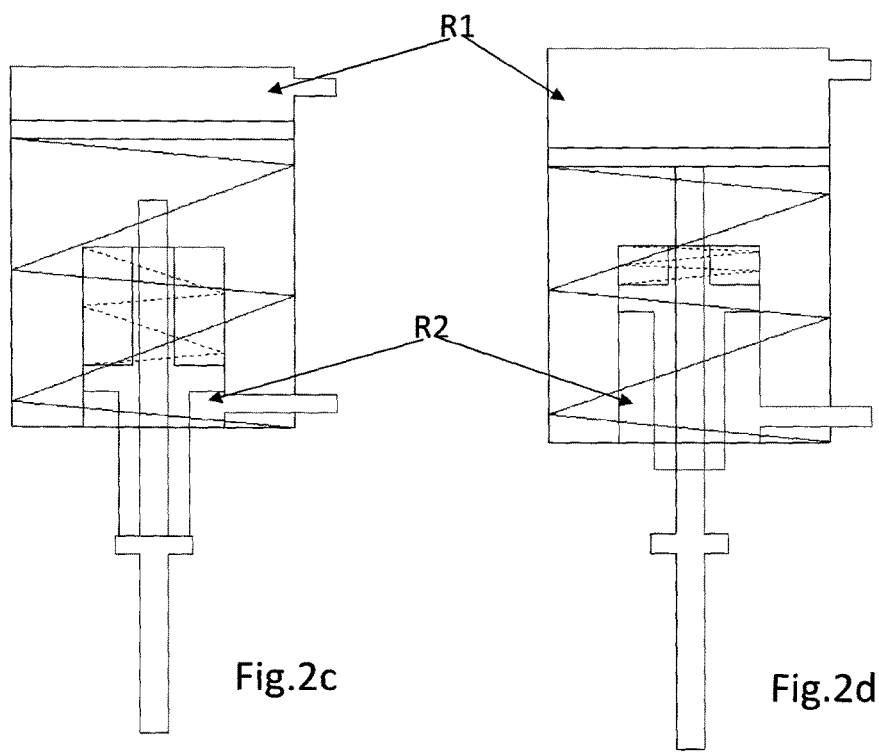

FIGS. 2a, 2b and 2c show schematically "such valve in the valve".

In particular, the oil-driven valve OV is integrated in a wastegate valve WG.

According to the figures from 3 to 7, such "double driving inlet valve", comprises
- a first inlet GI, intended to be operatively connected with the intake manifold of the internal combustion engine,
- a first expansible chamber R1, wherein said first inlet opens GI, made between the case CE and a first movable part D1,
- a first spring S1, placed between the first movable part D1 and a first fixed point SF1, within the external case CE, opposing to an expansion of the first chamber R1 against the pressure that is generated within it for the first inlet GI,
- a second inlet GO, intended to be operatively connected with the lubricating oil circuit of the turbo-supercharging unit, preferably with the inlet of such lubricating circuit,
- a second expansible chamber R2, wherein said second inlet opens GO, made between the case CE and a second movable part D2,
- a second spring S2, placed between the second movable part D2 and a second fixed point SF2, within the case CE, opposing to an expansion of the second chamber R2 against the pressure that is generated within it for the second inlet GO,
- a single shaft SH, movable between a retracted and an extended position, connected with the membranes D1 and D2 to control the bypass of the turbine T.

Preferably, fixed points SF1, SF2 and the membranes D1, D2 are reciprocally arranged so as to move in a reciprocal opposite way, the one with respect to the other, when the respective thresholds of the pressure generated in the respective chambers R1, R2 are reached, so that the shaft SH is forced to move to the extended position (or vice versa to the retracted position) when at least one of the following conditions is verified:
- the pressure of the intake gases is equal to or exceeds said first predetermined threshold,
- the pressure of the lubricated oil is equal or below to said second predetermined threshold.

Obviously, the link between the condition of extension/retraction of the shaft SH and the condition of opening/closing of the bypass pipe GB depends on the assembling desired by the person skilled in the art.

Figure 3:
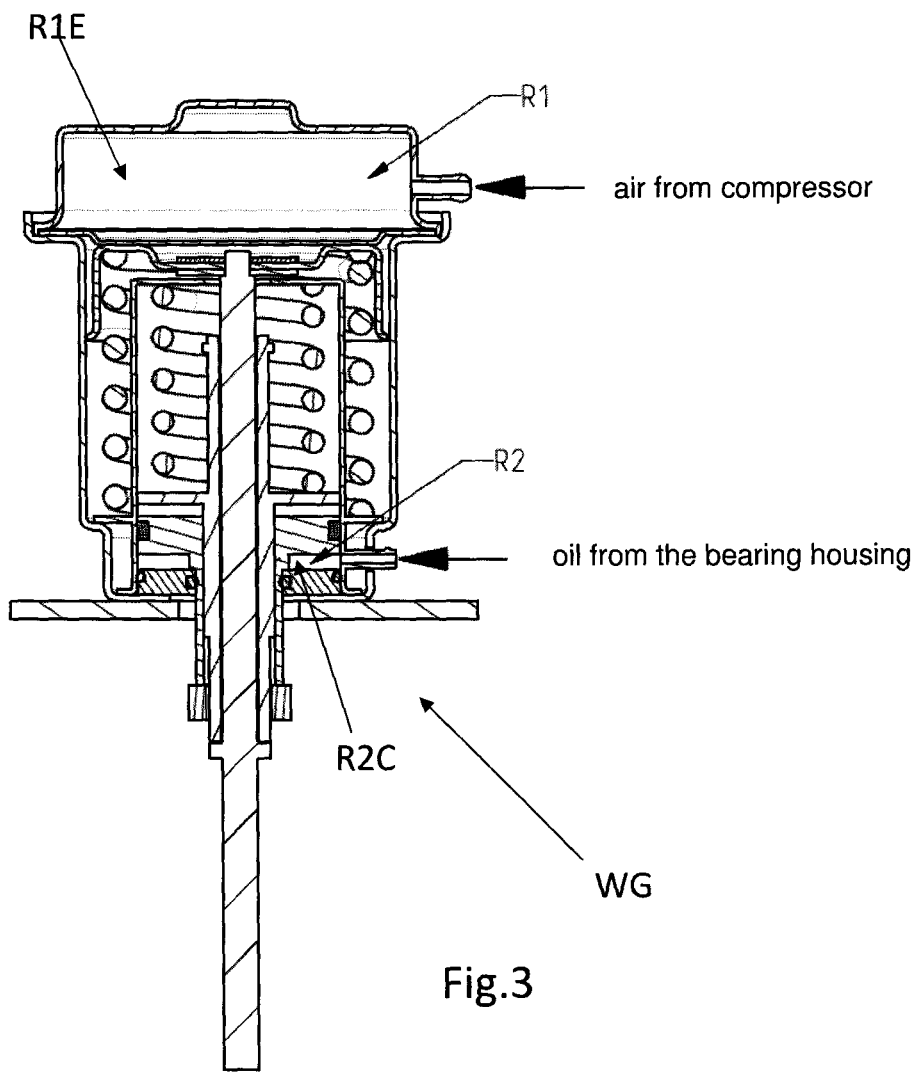
FIG. 3 shows a preferred alternative embodiment of the part shown in FIGS. 2a-2d in a first operating configuration.

FIG. 3 or 2a shows a condition wherein the first chamber R1 is expanded (R1E) while the second chamber R2 is retracted (R2C), while the shaft SH is in an extended condition with the bypass pipe open.

Figure 4:
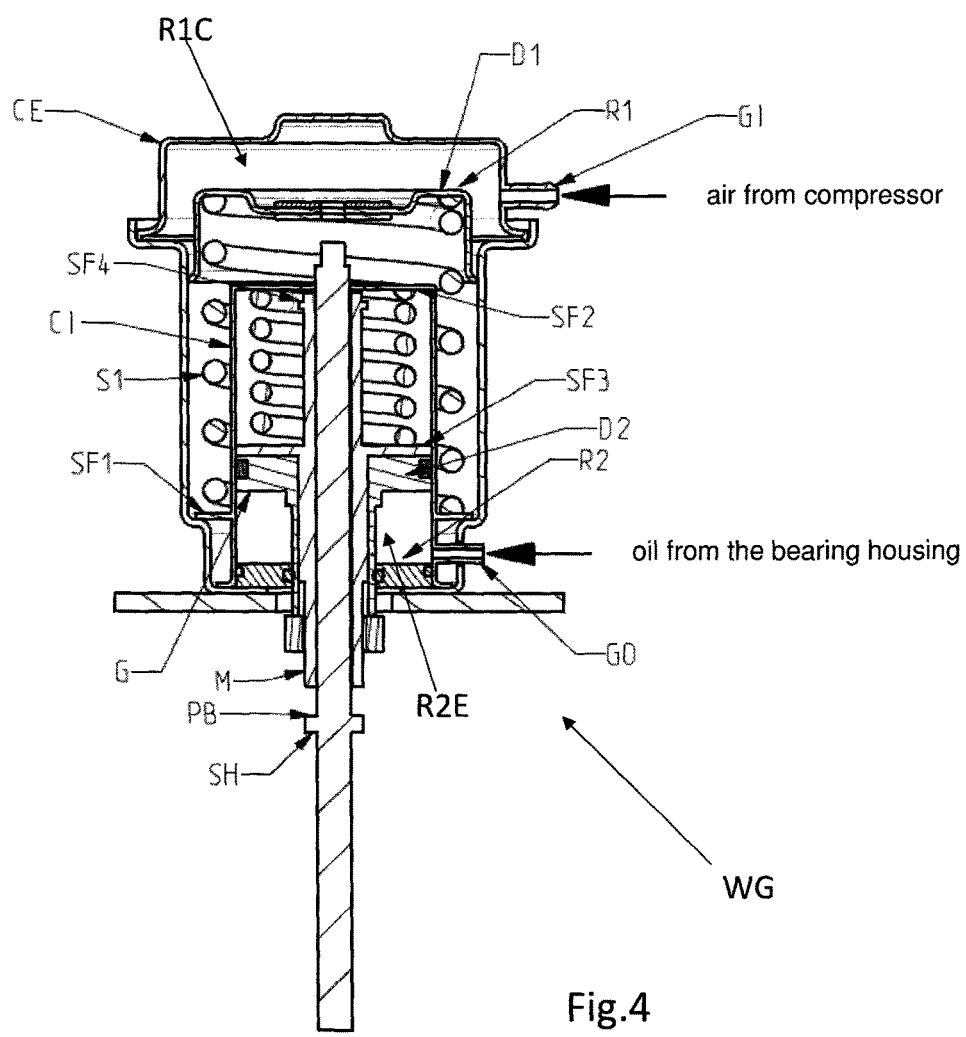
FIGS. 4-6 show further operating configurations of the preferred alternative embodiment shown in FIG. 3.

FIG. 4 or 2b shows a condition wherein the first chamber R1 is retracted (R1C) while the second chamber R2 is extended (R2E), while the shaft SH is in a retracted condition with the bypass pipe GB closed.

Figure 5:
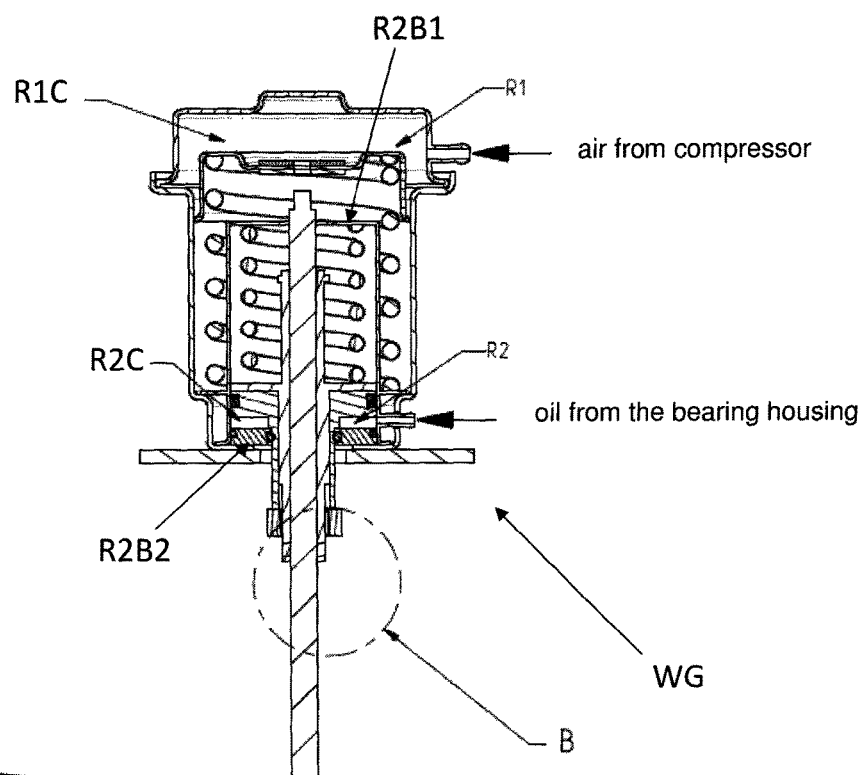
Figure 5B:
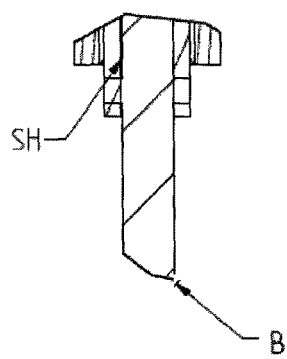

FIG. 5 or 2c shows a condition wherein both the first chamber R1 and the second chamber R2 are retracted (R1C, R2C), while the shaft SH is in an extended condition with the bypass pipe open.

Figure 6:
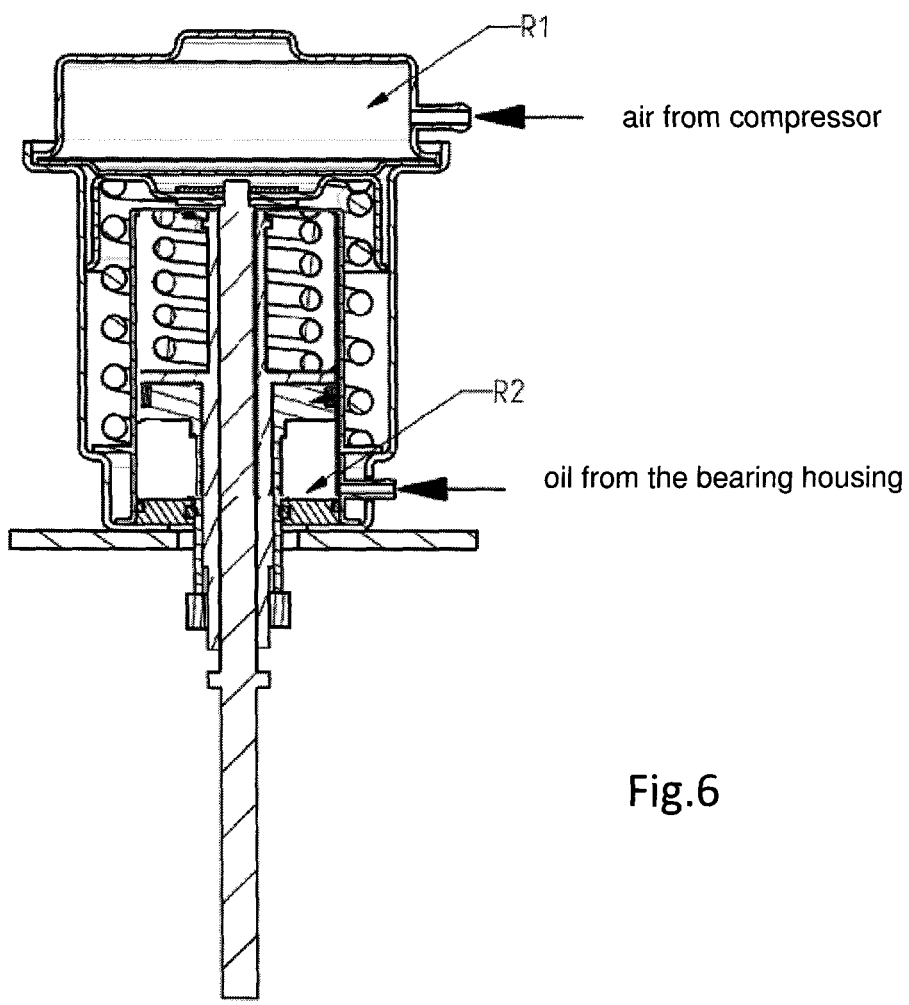

FIG. 6 or 2d shows a condition wherein both the first chamber R1 and the second chamber R2 are extended, while the shaft SH is in an extended condition with the bypass pipe open.

The opening condition of the bypass pipe can be operated as to fully or partially deviate the exhaust gas.

Furthermore, the expanded condition of the first chamber R1 may force a different portion of exhaust gas through the bypass pipe GB, with respect to a retracted condition of the second chamber R2. This is because, for example, in condition of cold engine and thus of inefficient lubrication of the turbo-supercharging unit, it can be desirable that it is fully deactivated instead of being partially bypassed, as it usually happens with the wastegate valves.

In other words, the shaft SH can have a different travel in relation to the fact that it is activated by the expansion of the wastegate valve WG, rather than by the oil-driven valve OV.

According to a further preferred alternative embodiment of the invention, the two membranes/pistons are parallel to each other. According to another preferred alternative embodiment of the invention, the springs S1 and S2 are of the helicoidal type and are coaxial to each other. Preferably, the first spring S1, since it has to oppose higher forces, is arranged externally to the second spring S2.

Between the two helicoidal springs, an internal case CI is interposed, being of cylindrical shape and coaxial with the springs S1 and S2, wherein both bases have respective central holes, which are passed through by the shaft SH. At least the second base R2B2 of such internal case CI, which contributes to define the second chamber R2, is equipped with an appropriate gasket G. The first base R2B1, instead, confines with the expansion zone of the first chamber R1.

It is worth noting that the second base of the internal case coincides with a base of the external case CE.

It is worth noting that in the drawings the first chamber R1 is equipped with a membrane D1, while the second chamber R2 is equipped with a movable piston D2. This does not mean that both components D1 and D2 can be membranes or movable pistons. More generally, such membranes/pistons can be generally indicated as "movable parts".

According to a further alternative embodiment, resulting from the combination of the first two, in accordance with what shown in the figures, the shaft SH is perpendicular to both the membranes D1 and D2 and the second movable part D2 is annular with respect to the shaft SH, since it can slide over it up to an abutment point of the shaft SH.

Thus the shaft SH has a first end, adapted to be in contact with and to be pushed with/from the center of the first movable part D1 and a second end that activates the bypass means. When the second movable part D2—following to a contraction of the second chamber R2—presses against the abutment point PB, then the shaft is brought to the extended condition.

The abutment point PB is in an intermediate position between the aforementioned two ends of the shaft SH.

According to a further preferred alternative embodiment of the invention that can be combined with the ones previously described, the second spring can be pre-loaded.

Figure 7:
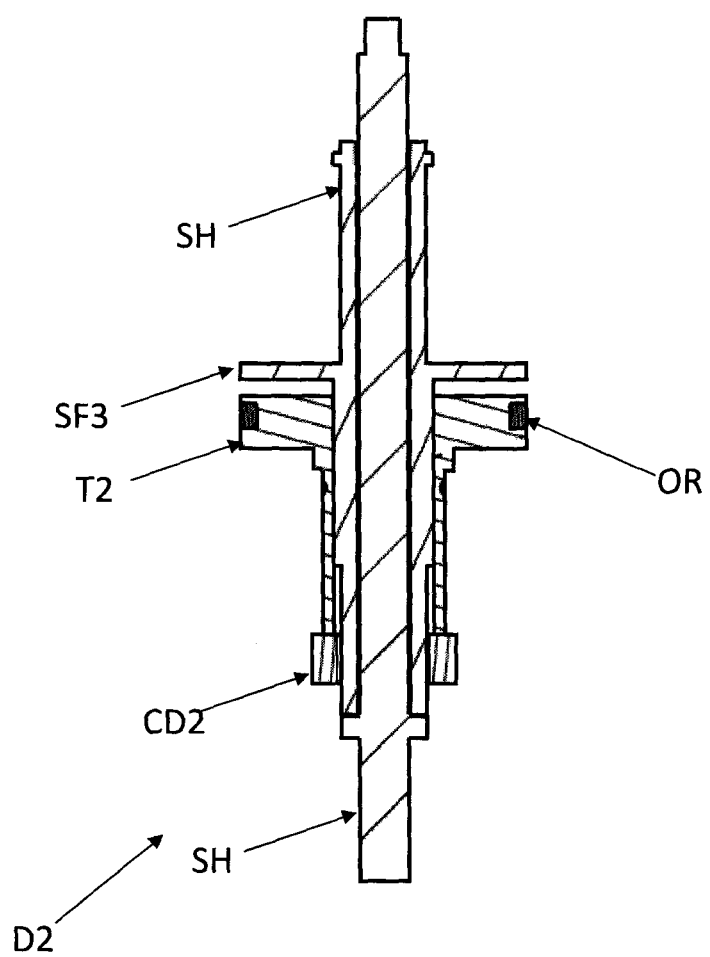
FIG. 7 shows a part of the preferred alternative embodiment of the previous FIGS. 3-6.

FIG. 7 shows the second movable part D2 in detail. It comprises a sleeve M (also called slider) coaxial with and sliding on the shaft SH and a sealing part T2 annular with respect to the sleeve M. The sealing part T2 is preferably screwed on the sleeve M. FIG. 7 shows a lock nut CD2, which is also screwed on the sleeve M to block the sealing part T2, which has an annular groove where an o-ring is housed.

The sealing part T2 can be directly in contact with the helicoidal spring S2. Preferably, the sleeve is equipped with an appropriate annular expansion SF3 which defines a second compression surface of the second spring S2. The first compression surface of the second spring is preferably the inner part of the first base R2B1 of the internal case CI, opposite to the aforementioned second base R2B2.

From the configuration shown, the external case CE, which is substantially cylindrical, contains the first movable part D1 and the first cylindrical spring S1, which, in its turn, contains the second case CI, where the second spring S2 and the second movable part D2.

If the sleeve is equipped with said annular expansion SF3 by axially moving the movable part D2 with respect to the sliding sleeve M it is possible to define a pre-load for the second spring S2. In particular, as the sealing part T2 of the second movable part D2 moves away from the annular expansion SF3, the pre-load for the second spring S2 increases.

The sliding sleeve M can find an abutment point in the first base R2B1 of the internal case CI. Or, optionally, it can pass through the first base of the inner case CI in its respective central hole, up to the interference between the base itself and an abutment element SF4, obtained annularly on the sliding sleeve M itself.

In terms of method, according to the present invention, the bypass of the exhaust gas is operated when the pressure of the lubricating oil of the turbine is not sufficient.

It will be apparent to the person skilled in the art that other alternative and equivalent embodiments of the invention can be conceived and reduced to practice without departing from the scope of the invention.

From the description set forth above it will be possible for the person skilled in the art to embody the invention with no need of describing further construction details. The elements and the characteristics described in the different preferred embodiments may be combined without departing from the scope of the present application. What is described in the description of the prior art, if not explicitly excluded in the detailed description, has to be considered in combination with the characteristics of the present invention, forming an integral part of the present invention.

The invention claimed is:

1. A system for protecting a turbo-supercharging unit when a lubricating oil pressure is insufficient, comprising:
    a wastegate valve configured to bypass exhaust gas from entering a turbine of the turbo-supercharger unit; and
    an actuator of the wastegate valve comprising, the actuator of the wastegate valve further comprising:
    an external case;
    a first expansible chamber located between the external case and a first movable part;
    a first inlet on the first expansible chamber, the first inlet connected to an intake manifold of an internal combustion engine;
    a first spring placed between the first movable part and a first fixed point within the external case, the first spring biasing against expansion of the first expansible chamber,
    a second inlet connected to a lubricating oil circuit of the turbo-supercharging unit;
    a second expansible chamber into which said second inlet opens, the second expansible chamber located between an internal case and a second movable part;
    a second spring located between the second movable part and a second fixed point within the external case, the second spring biasing against an expansion of the second expansible chamber;
    a single shaft movable between a retracted and an extended position, the single shaft connected with said first movable part and second movable part to control bypassing of the turbine;
        wherein the wastegate valve is controlled based the lubricating oil pressure in the lubricating oil circuit of the turbo-supercharging unit to bypass the exhaust gas from entering the turbine of the turbo-supercharger when the lubricating oil pressure is below a first predetermined threshold in the second expansible chamber;
        wherein the wastegate valve is additionally controlled based on a fresh air pressure measured at the intake manifold, when the fresh air pressure exceeds a second predetermined threshold, when the pressure of the fresh air exceeds a second predetermined threshold in the first expansible chamber, the wastegate is controlled to bypass the exhaust from entering the turbine of the turbo-supercharger,
        wherein said first and second fixed points and the first and second movable parts are reciprocally arranged with respect to the other, and
            the first and second movable parts move in a reciprocally opposing manner when fresh air pressure exceeds the second predetermined threshold in the first expansible chamber and the pressure of the lubricating oil is below the first predetermined threshold in the second expansible chamber.

2. The system according to claim 1, wherein the single shaft is forced to move to the extended position or to the retracted position when at least one of the following occurs:
    the fresh air pressure is equal to or exceeds the second predetermined threshold;
    the lubricating oil pressure is equal or below to the first predetermined threshold.

3. The system according to claim 2, wherein the first and second movable parts are parallel to each other; or
    wherein said second movable part comprises means for pre-loading said second spring; or
    wherein the first and second springs are of the helicoidal type and are coaxial with each other, and one of the first and second springs is partially inserted in the other, and the internal case is interposed between the first and second springs, the internal case having a cylindrical shape, a first base on a first end, and a second base on a second end, the internal case being coaxial with the first and second springs, wherein both the first base and the second base of the internal case have respective central holes through which the single shaft passes; or both of the above in combination.

4. The system according to claim 3, wherein the single shaft is perpendicular to both of the first and second movable parts, and the single shaft has a first shaft end corresponding to a center of said first movable part, while the second movable part is annular with respect to the single shaft, the second movable part slidable on the single shaft up to an abutment point of the single shaft.

5. The system according to claim 4, wherein the first base of said internal case defines a first compression surface of said second spring; or wherein said second movable part comprises a piston and sleeve, the second movable part coaxial with, and sliding on, the single shaft; or wherein said sleeve has an annular expansion which defines a second compression surface of the second spring or the first base of said internal case defines a first compression surface of said second spring; or wherein said second movable part comprises a piston and sleeve, the second movable part coaxial with, and sliding on, the single shaft and wherein said sliding sleeve has an annular expansion which defines a second compression surface of the second spring and wherein a reciprocal position between said annular expansion and said piston is adjustable to define said pre-load of said second spring; or a combination of two or more of the above.

6. A vehicle comprising an internal combustion engine having a turbo-supercharging system and a system for protecting the turbo-supercharging system according to claim 1.

* * * * *